United States Patent
Goode (10) Patent No.: US 7,434,242 B1
(45) Date of Patent: Oct. 7, 2008

(54) MULTIPLE CONTENT SUPPLIER VIDEO ASSET SCHEDULING

(75) Inventor: Christopher W. B. Goode, Menlo Park, CA (US)

(73) Assignee: Sedna Patent Services, LLC, Philadelphia, PA (US)

( * ) Notice: Subject to any disclaimer, the term of this patent is extended or adjusted under 35 U.S.C. 154(b) by 832 days.

(21) Appl. No.: 09/633,197

(22) Filed: Aug. 7, 2000

(51) Int. Cl.
*H04N 7/16* (2006.01)
*H04N 7/173* (2006.01)
*G06F 15/16* (2006.01)
*G06F 15/167* (2006.01)

(52) U.S. Cl. .............. 725/9; 725/87; 725/91; 725/94; 725/114; 725/115; 725/138; 725/144; 725/145; 709/215; 709/217

(58) Field of Classification Search .......... 725/87, 725/91–97, 103–104, 114, 138, 144–145, 725/4, 215, 23, 115; 705/25–26, 9, 87, 91–98, 705/103–104, 114–115, 138, 144–145; 709/223, 709/225, 228–229, 217, 215, 219
See application file for complete search history.

(56) References Cited

U.S. PATENT DOCUMENTS

| | | | | |
|---|---|---|---|---|
| 5,093,718 A | * | 3/1992 | Hoarty et al. | 358/84 |
| 5,155,591 A | * | 10/1992 | Wachob | 725/35 |
| 5,557,317 A | * | 9/1996 | Nishio et al. | 348/7 |
| 5,583,995 A | * | 12/1996 | Gardner et al. | 709/219 |
| 5,650,994 A | | 7/1997 | Daley | |
| 5,673,430 A | | 9/1997 | Story | |
| 5,719,983 A | * | 2/1998 | Henderson et al. | 386/70 |
| 5,790,176 A | * | 8/1998 | Craig | 725/115 |
| 5,790,828 A | * | 8/1998 | Jost | 711/4 |
| 5,790,935 A | | 8/1998 | Payton | |
| 5,815,662 A | | 9/1998 | Ong | |
| 5,825,768 A | * | 10/1998 | Kimbrow et al. | 370/341 |
| 5,860,131 A | * | 1/1999 | Daub | 711/170 |
| 5,884,284 A | * | 3/1999 | Peters et al. | 705/30 |
| 5,898,456 A | * | 4/1999 | Wahl | 348/7 |
| 5,909,638 A | * | 6/1999 | Allen | 725/146 |
| 5,920,700 A | * | 7/1999 | Gordon et al. | 709/226 |
| 5,923,361 A | * | 7/1999 | Sutton, Jr. | 725/93 |
| 5,991,306 A | * | 11/1999 | Burns et al. | 370/429 |
| 6,006,257 A | * | 12/1999 | Slezak | 725/110 |
| 6,014,644 A | * | 1/2000 | Erickson | 705/37 |
| 6,035,281 A | * | 3/2000 | Crosskey et al. | 705/14 |
| 6,057,872 A | * | 5/2000 | Candelore | 725/23 |

(Continued)

FOREIGN PATENT DOCUMENTS

EP     06 07 5512     4/2006

OTHER PUBLICATIONS

Supplementary European Search Report dated Mar. 31, 2004, Patent No. 01959568.5-1522-US0124624.

(Continued)

*Primary Examiner*—Son P Huynh
(74) *Attorney, Agent, or Firm*—Patterson & Sheridan, LLP (57) ABSTRACT

An apparatus and method for allocating management functions within an interactive information distribution system between service providers and content providers whereby content providers lease respective portions of available resources within the service provider and manage content provided to subscribers from said leased resources.

17 Claims, 5 Drawing Sheets

U.S. PATENT DOCUMENTS

| | | | |
|---|---|---|---|
| 6,094,680 A * | 7/2000 | Hokanson | 709/223 |
| 6,094,695 A * | 7/2000 | Kornher | 710/56 |
| 6,115,740 A * | 9/2000 | Mizutani | 709/217 |
| 6,119,152 A * | 9/2000 | Carlin et al. | 709/217 |
| 6,189,033 B1 * | 2/2001 | Jin et al. | 709/225 |
| 6,195,331 B1 * | 2/2001 | Tani | 370/230 |
| 6,201,536 B1 * | 3/2001 | Hendricks et al. | 345/716 |
| 6,249,836 B1 * | 6/2001 | Downs et al. | 710/268 |
| 6,298,373 B1 * | 10/2001 | Burns et al. | 709/203 |
| 6,330,326 B1 * | 12/2001 | Whitt | 379/265.13 |
| 6,330,602 B1 * | 12/2001 | Law et al. | 709/224 |
| 6,381,746 B1 * | 4/2002 | Urry | 725/87 |
| 6,389,471 B1 * | 5/2002 | Agraharam et al. | 709/227 |
| 6,389,538 B1 * | 5/2002 | Gruse et al. | 713/194 |
| 6,449,688 B1 * | 9/2002 | Peters et al. | 711/112 |
| 6,473,902 B1 * | 10/2002 | Noritomi | 725/91 |
| 6,502,242 B1 * | 12/2002 | Howe et al. | 725/109 |
| 6,516,350 B1 * | 2/2003 | Lumelsky et al. | 709/226 |
| 6,530,082 B1 * | 3/2003 | Del Sesto et al. | 725/9 |
| 6,539,548 B1 * | 3/2003 | Hendricks et al. | 725/109 |
| 6,564,380 B1 * | 5/2003 | Murphy | 725/86 |
| 6,606,607 B1 * | 8/2003 | Martin et al. | 705/37 |
| 6,625,750 B1 * | 9/2003 | Duso et al. | 714/11 |
| 6,637,032 B1 * | 10/2003 | Feinleib | 725/110 |
| 6,658,663 B1 * | 12/2003 | Bruynsteen | 725/134 |
| 6,721,794 B2 * | 4/2004 | Taylor et al. | 709/231 |
| 6,769,127 B1 * | 7/2004 | Bonomi et al. | 725/39 |
| 6,772,209 B1 * | 8/2004 | Chernock et al. | 709/225 |
| 6,782,550 B1 * | 8/2004 | Cao | 725/39 |
| 6,789,103 B1 * | 9/2004 | Kim et al. | 709/203 |
| 6,820,277 B1 * | 11/2004 | Eldering et al. | 725/35 |
| 6,973,662 B1 * | 12/2005 | Sie et al. | 725/25 |
| 2001/0011374 A1 * | 8/2001 | Lerman et al. | 725/92 |
| 2002/0007402 A1 * | 1/2002 | Thomas Huston et al. | 709/217 |
| 2002/0007494 A1 * | 1/2002 | Hodge | 725/109 |
| 2002/0013947 A1 * | 1/2002 | Russell et al. | 725/90 |
| 2002/0023270 A1 * | 2/2002 | Thomas et al. | 725/95 |
| 2002/0069420 A1 * | 6/2002 | Russell et al. | 725/92 |
| 2002/0083148 A1 * | 6/2002 | Shaw et al. | 709/214 |
| 2002/0143565 A1 * | 10/2002 | Headings et al. | 705/1 |
| 2003/0040962 A1 * | 2/2003 | Lewis | 705/14 |
| 2003/0133692 A1 * | 7/2003 | Hunter | 386/35 |

OTHER PUBLICATIONS

Albonesi D H: "Selective cache ways: on-demand cache resource allocation" Micro-32. Proceedings of the 32$^{nd}$ Annual ACM/IEEE International Symposium on Microarchitecture. Haifa, Israel, Nov. 16-18, 1999, Proceedings of the Annual ACM/IEEE International Symposium on Microarchitecture, Los Alamitos, CA: IEEE Comp. Soc, US, Nov. 16, 1999, pp. 248-259, XP010364933, ISBN: 0-7695-0437-X.

* cited by examiner

MULTIPLE CONTENT SUPPLIER VIDEO ASSET SCHEDULING

CROSS-REFERENCE TO RELATED APPLICATIONS

This application is related to U.S. non-provisional patent application Ser. No. 09/538,176, filed Mar. 30, 2000 which is hereby incorporated by reference in its entirety.

BACKGROUND OF THE INVENTION

1. Field of the Invention

The present invention relates to an interactive information distribution system such as a video-on-demand (VOD) system. More particularly, the present invention relates to a method and apparatus for providing to a server complex within such system video assets sourced from a plurality of content suppliers.

2. Description of the Background Art

Within the context of an interactive information distribution system, one or more servers provide information to respective groups or "neighborhoods" of subscribers via a communications network. The information distributed by the server typically comprises at least movies and other audiovisual entertainment programming. The movies or other audiovisual entertainment programming are provided by content suppliers or content providers such as movie studios, television networks and other sources. The information distribution system typically stores such content in a centralized server and "provisions" the neighborhood servers as appropriate. One example of such a system is the so-called Multiple System Operator (MSO) cable television provider.

At present, the content provided to subscribers and the scheduling decisions regarding the content are based on a "rights" agreement to various titles negotiated between the service provider and the various content providers. The commercial conditions under which a studio or other content provider makes a title available on a VOD system includes date, times of presentation, price and the like. These conditions may include minimum buys for which a service provider must pay independent of usage. Thus, the service provider must determine, a priori, the appropriate title and rights parameters to be negotiated such that the subscribers are satisfied.

Unfortunately, such a determination of the exact programming needs of the subscriber community, or the particular tastes of the subscriber community with respect to various types of on-demand content cannot be made with great accuracy. Broadly speaking, an information provider can generally assume that certain titles or content (e.g., new movie releases) will be readily consumed by the subscriber community. However, such a determination is not always clear and, moreover, the risk of an incorrect determination is typically borne by the service provider and not the content provider.

Therefore, it is seen to be desirable to provide a means of sharing content-related risk between a service provider and the content supplier in an information distribution system. More generally, it is deemed to be desirable to devolve management responsibility of the content supplier function and the service provider function within the context of an information distribution system such that content providers and service provider are respectively tasked with managing appropriate portions of the system.

SUMMARY OF THE INVENTION

The disadvantages discussed herein are overcome by the present apparatus and method for scheduling and distributing video assets and other assets to and among service provider equipment in an interactive information distribution system. The apparatus and method of the present invention advantageously allocates the risks of incorrect or sub-optimal programming decisions by dividing the information distribution functions and content provisioning functions between, respectively, service providers and content providers.

In one embodiment of the invention, content providers "lease" a defined portion of storage and/or bandwidth of a service provider, such as partitions within a server complex having associated with it a finite amount of storage and/or forward channel bandwidth capacity. In this embodiment of the invention, usage statistics provided by the service provider to content providers are used by the content providers to manage content and/or other video assets stored within respective leased partitions such that content provider return on investment is maximized. Advantageously, information providers, such as cable television multiple system operators (MSO), may focus their attentions on insuring that the subscriber base is satisfied and the infrastructure to support the system is robust, while content providers may focus their attention on ensuring that content offerings to subscribers are compelling and, more importantly, purchased.

In another embodiment of the invention, content selection decisions are made by an MSO or other service provider. Statistics related to usage and content-centered data are used by the MSO of other service provider to select content to be made available to a subscriber base. Service or system operational statistics are used by the MSO or other service provider to adapt the system to such subscriber usage. Advantageously, information providers, such as MSOs may retain tight control over the content offered through their systems, while content providers are tasked with delivering selected content directly to content injection points and in a form adapted to the service provider's resources, thereby minimizing pre-processing of delivered content by the service provider.

BRIEF DESCRIPTION OF THE DRAWINGS

The teachings of the present invention may be readily understood by considering the following detailed description in conjunction with the accompanying drawings in which.

To facilitate understanding, identical reference numerals have been used, where possible, to designate identical elements that are common to the figures.

DETAILED DESCRIPTION OF THE INVENTION

Figure 1:
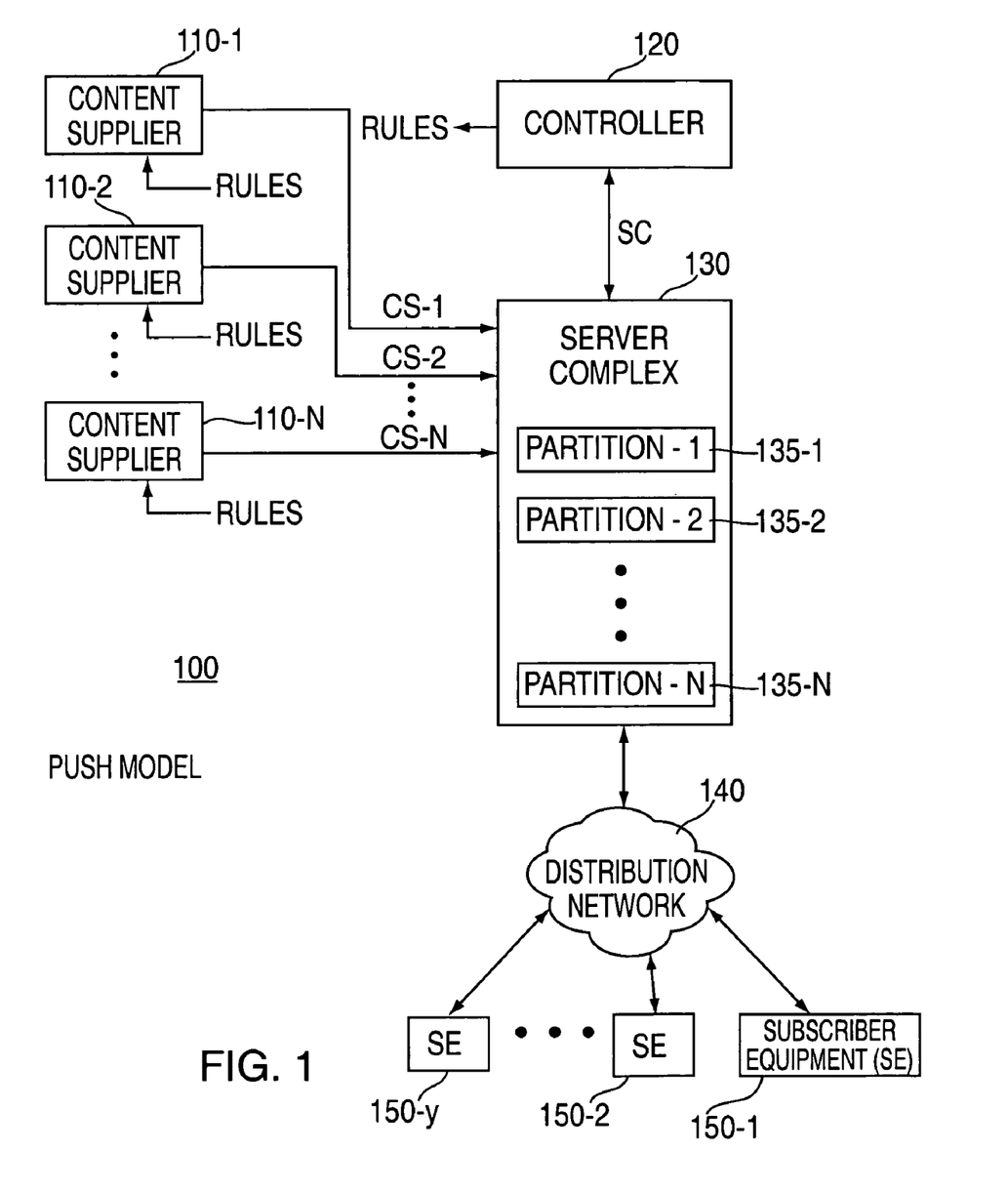
FIG. 1 depicts a high level block diagram of an interactive information distribution system benefiting from the present invention.

FIG. 1 depicts a high level block diagram of an interactive information distribution system benefiting from the present invention. Specifically, the interactive information distribution system 100 of FIG. 1 comprises a plurality of content suppliers 110-1 through 110-N (collectively content suppliers 110), a controller 120, a server complex 130, a distribution network 140 and subscriber equipment 150-1 through 150-Y (collectively subscriber equipment 150).

The server complex 130 comprises modulation and transmission circuitry (not shown) suitable for coupling video and other assets to the subscriber equipment 150 via a forward channel implemented within the distribution network 140 of FIG. 1. The server complex 130 also includes receiving and demodulation circuitry (not shown) suitable for receiving information requests and other controller information via a back channel, a control channel implemented within the distribution network 140 of FIG. 1.

The server complex 130 may comprise a single video server or an entire network of video servers. The video servers within the server complex 130 may support a head-end of a cable system serving a respective neighborhood of subscribers. The video servers within the server complex 130 may support a plurality of head-ends within a cable system serving respective neighborhoods of subscribers.

The server complex 130 also comprises a plurality of partitions denoted as partitions 135-1 through 135-N (collectively partitions 135). Each partition 135 within the server complex 130 has associated with it a respective content supplier 110. Each content supplier 110 provides video assets and other content to the server complex 130 via respective content signal paths CS-1 through CS-N (collectively content streams CS).

The partitions 135 within the server complex 130 may comprise partitions within a single video server or partitions across a plurality of video servers, including geographically distant video servers. Moreover, the partitions 135 may be of different sizes, depending upon the needs of content suppliers and commercial arrangements negotiated with service operator. Within the embodiment of FIG. 1, the controller 120 comprises an MSO controller. That is, the controller 120 implements the various control functions of a multiple system operator (MSO). It should also be noted that the partition size and/or other parameters associated with resources used by content suppliers may be dynamically adjusted. That is, the partition size, memory or resources associated with a particular content supplier 110 may be dynamically adjusted in response to change in requirements of the content supplier or service provider. Therefore, it will be appreciated by those skilled in the art that any allocation of resources, such as memory resources, described below may be adjusted statically or dynamically.

The content providers 110 manage the content or video assets (e.g., the movie titles) stored in their respective partitions 135. The content suppliers 110 also provide subscriber navigation functionality, as well as promotion and packaging of their content according to rules defined by both the controller 120 and content suppliers 110 and implemented by the controller 120. For example, the content provider may determine that a minimum price is to be applied, while leaving some sales opportunity to the MSO. The rules are defined by the content provider and service provider and implemented by the controller 120 via a signal path denoted as RULES.

The controller 120 manages the operation of the server complex 130. The controller 120 manages the partitions 135 of the server complex 130 as a set of distinct storage spaces which are "leased", sold, licensed or otherwise compensably allocated to the content providers 110, for example, by auctioning partitions to the content suppliers. Other means of transferring management of partitions 135 to the content providers 110 will be readily understood by those skilled in the art. In essence, the actual operation of the server complex 130 is managed by the controller 120, while the content and other parameters associated with the partitions of the various content providers 110 are implemented by the controller 120 on behalf of the content providers 110.

A session manager (not shown) located within the controller 120 or server complex 130 provides all session management functionality between the provider equipment (110-130) and subscriber equipment (150) in the system 100 of FIG. 1. The controller 120 collects usage statistics for each of the titles provided by the content suppliers 110, statistics regarding the use of storage space within the server complex 130 and the individual partitions 135, the use of bandwidth within the interactive information distribution system 100 and other usage parameters known to those skilled in the art. Additionally, in the case of the server complex 130 comprising a plurality of video servers, the controller 120 migrates titles between the video servers to accommodate or "share" the loading placed upon the server complex 130 by the subscriber equipment 150 and within the context of agreements between the content suppliers 110 and the controller 120. Thus, the controller 120 migrates titles between different video servers of a content supplier's partition to enable the subscriber community to access the titles as desired. The controller 120 performs one or both of a coarse management function (e.g., inter-server title migration) and a fine management function (intra-server processing such as real time server control, session management functions and the like).

Importantly, individual content suppliers 110 manage the titles stored in their respective partitions (i.e., their "available space"), the packaging of the content and the promotion of the content such that the content suppliers maximize the return on their content investment. The Controller 120 manages the various aspects of storing and distributing, via server complex 130, the provided content to the subscriber equipment 150. The Controller 120 manages the system scheduling functions and other parameters associated with the interactive information distribution system 100 of FIG. 1. The Controller 120 provides statistical data to the various content suppliers 110 such that the content suppliers are able to refine their respective management decisions as to type of content or titles to be stored in their respective partitions 135.

The embodiment of the invention discussed above with respect to FIG. 1 comprises a "push model" of scheduling. That is, the content suppliers 110 push content to their respective server complex partitions 135 based upon factors relevant to the content suppliers. For example, where the content suppliers are interested in ensuring that subscribers view particular content, that content is pushed to the storage partitions 135 and made available to the subscriber community. That is, the content suppliers 110 may promote a discount for particular content, provide prominent advertising or "placement" of the content or otherwise seek to ensure a large audience for the content.

In one embodiment of the invention, a "pull model" of scheduling is used. In the pull model of scheduling, subscriber requests for video assets and other assets are tracked by the controller 120, which provides this information to the content providers. The content providers responsively adapt the content stored in their respective partitions 135 to reflect the content demanded by the subscriber community. In this manner, the subscriber community impacts the type and availability of various content titles by requesting or demanding such titles. In addition, the subscriber community may be provided with one or both of direct access to titles or delayed access to titles, where delayed access is defined in terms of a time delay between the availability of a title generally and the availability of that title to the subscriber community. Delayed access to titles may be provided using a lower cost or revenue structure. A method according to the invention and utilizing the system 100 of FIG. 1 will be described in more detail below with respect to FIG. 3. An alternate embodiment of an interactive information distribution system utilizing the pull model of scheduling will now be discussed in more detail with respect to FIG. 2.

It will be appreciated by those skilled in the art, especially those familiar with industry practices, that the subject invention modifies the entity making scheduling decisions. That is, the entity making the scheduling decisions takes the risk of bad or good decision making. In this model, scheduling decision making is correspondingly penalized or rewarded within the context of the revenue sharing based upon subscriber fees. In the pull model, the content suppliers 110 make titles available under known terms and the controller 120 selects from the available titles (i.e., determines the schedule) to optimize the revenue generated by these titles. In one embodiment of the invention, customers may choose from any available title, whether scheduled or not, by accessing available titles from the controller 120 (i.e., scheduled titles) or by accessing non-scheduled titles that are, nevertheless, available from the content suppliers 110. In this embodiment of the invention, alternative revenue sharing means are employed to adequately compensate the various parties (i.e., content suppliers 110 and service providers).

Figure 2:
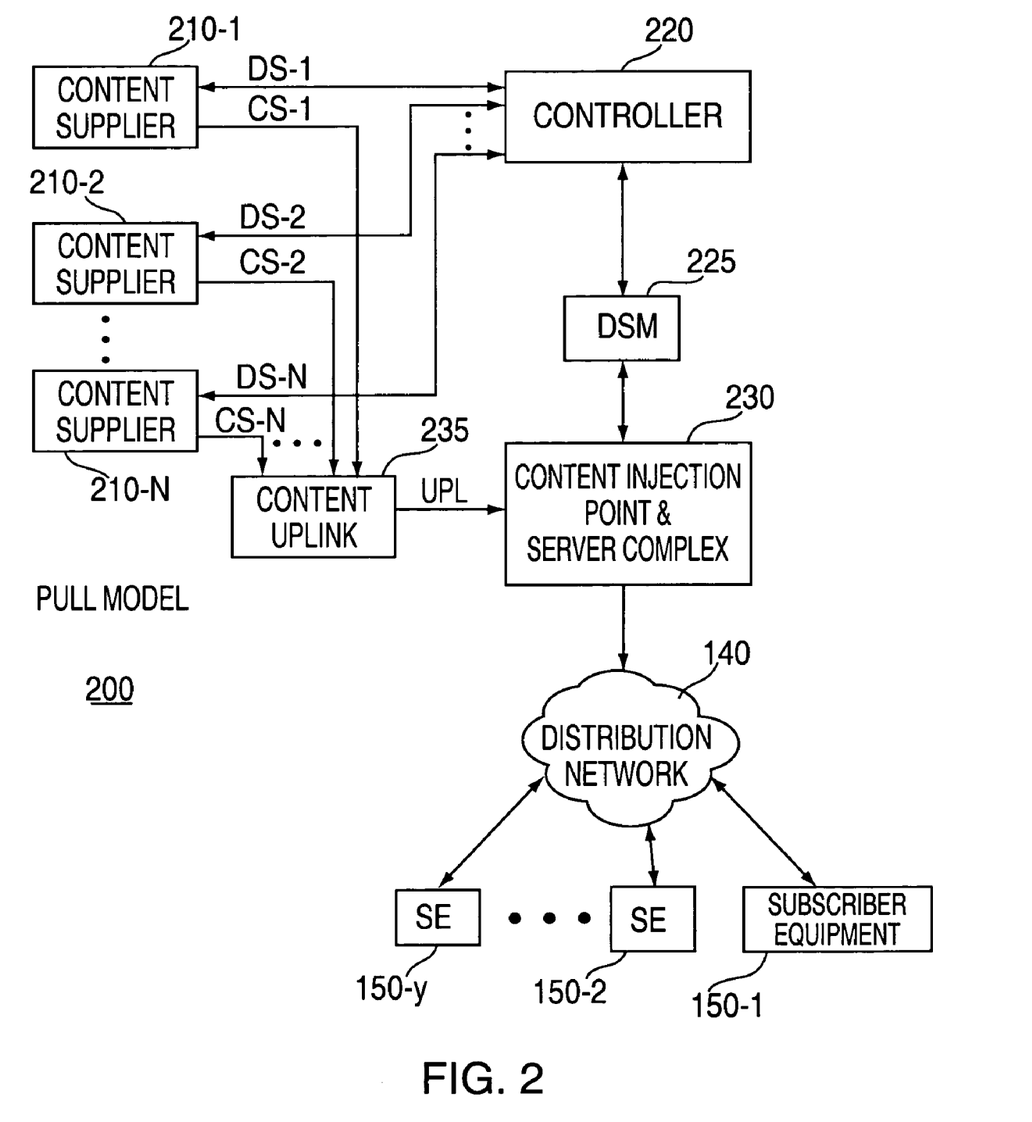
FIG. 2 depicts a high level block diagram of an interactive information distribution system benefiting from an alternate embodiment of the present invention.

FIG. 2 depicts a high level block diagram of an interactive information distribution system benefiting from an alternate embodiment of the present invention. Specifically, the interactive information distribution 200 of FIG. 2 comprises a plurality of content suppliers 210-1 through 210-N (collectively content suppliers 210), a controller 220, a DIVA System Manager (DSM) 225, a content injection point (CIP) and server complex 230, a distribution network 140 and subscriber equipment 150-1 through 150-Y (collectively subscriber equipment), and a content uplink 235. Since the distribution network 140 and subscriber equipment 150 perform substantially the same function as corresponding distribution network 140 and subscriber equipment 150 of FIG. 1, these elements will not be discussed in more detail.

The DIVA system manager (DSM) encompasses all of the operational software and/or hardware required in the head-end to support the DIVA video-on-demand service. The DSM provides, for example, session management functionality and control and management of on-demand television service as well as head-end equipment deployed in the delivery of such service. The DSM functions include network management functions, set top box session management functions, server and content management functions, subscriber management functions and billing management functions. Within the context of the present invention, the DSM cooperates with the controller 220 and content injection point and server complex 230.

The embodiment of the invention discussed with respect to FIG. 2 comprises a "pull model" of provisioning. Within the concept of the pull model of FIG. 2, scheduling decisions are made by programming personnel of, for example, the MSO. However, title and rights functions and content control center (CCC) functions are devolved to the content suppliers 210.

Title and rights functions comprise the tracking of the rights of the information server to the content provided by the content suppliers. The service provider rights to each title may be described in terms of one or more of the following parameters: title, service provider identification number, duration of content, description of content, actors, director, distributor, closed captioning, languages used, ratings and advisories, exhibition rights specifically granted to the service provider, sampling rate of underlying video and/or audio information and other information specifically related to the content and the ability of the service provider to use or otherwise supply the content to subscribers. Content control center functions comprise those functions necessary to enable a content supplier to provision one or more video servers with content. Content control center operations include, for example, the generation of work orders indicative of the need for particular content, the allocation of storage and/or bandwidth to accommodate the required content, scheduling and distribution data associated with the actual provisioning of the content and other related functions. In general, the content control center functions are those functions necessary to effect a transfer of content from a content provider to the appropriate portions of a service provider.

By off loading the title and rights functions and content control center functions to the content suppliers 210, the content suppliers 210 are able to tailor the delivery and consumption of content according to customer demand and in a manner tending to reduce the costs borne by the service provider.

In the arrangement of FIG. 2, suppliers to the MSO, such as content suppliers 210, publish a list of titles, availability, prices and other information released by the MSO schedule within the controller 220. The MSO's programming personnel make various programming decisions in a manner intending to maximize return on investment for the MSO. The content up-link gathers titles from the various content suppliers 210 in response to commands propagated to the content suppliers 210 by the controller 220. That is, the content suppliers 210 provide video assets and other assets to the content up-link 235 via respective content streams (CS). The content up-link 235 responsively provides such content to the content injection point and server complex 230 via an uplink stream UPL. The content up-link 235 may be owned by the MSO, one or more of the content suppliers 210 or a third party.

The controller 220 advises the content suppliers 210 as to the appropriate content to be supplied via respective data signals (DS). In this manner, the service provider retains control over the scheduling decisions and, moreover, such scheduling decisions are made with full knowledge of the cost of each scheduling decision. That is, since the service provider (e.g., an MSO) has been apprised of all costs associated with each title via the published list of titles, availability, prices and the like provided by the content suppliers 210, and since the MSO also maintains statistical data regarding content usage by the subscriber community, the MSO may make economically rational decisions with respect to the scheduling of content. Thus, the provisioning model encompassed by the embodiment of FIG. 2 enables an MSO to maximize the return on content investment and reduce the risk of improper scheduling decisions, since scheduling decisions are made rapidly and with current usage and cost information.

Figure 3:
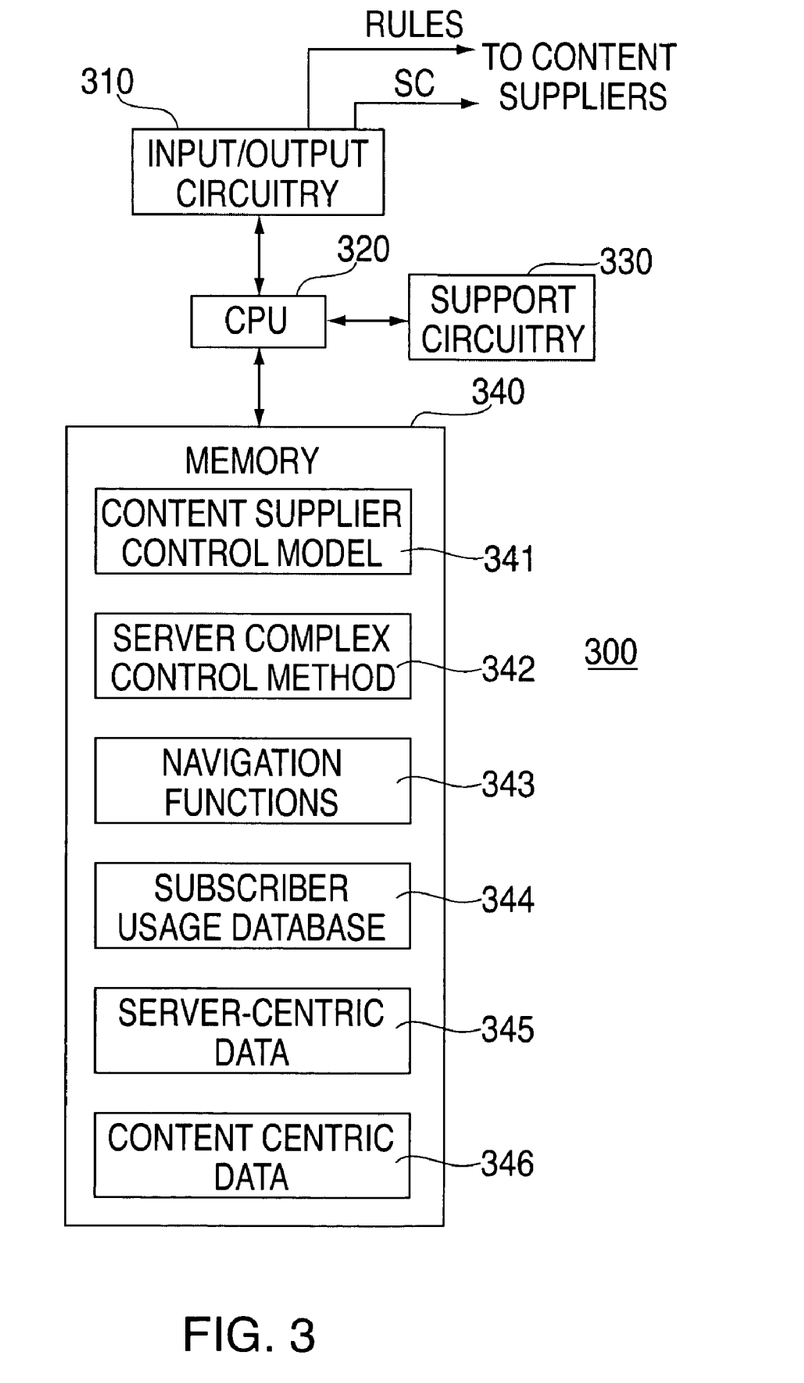
FIG. 3 depicts a functional block diagram of a controller suitable for use within the interactive information distribution systems of FIGS. 1 and 2.

FIG. 3 depicts a simplified block diagram of a controller suitable for use in the interactive information distribution systems of FIGS. 1 and 2. It will be noted that the controller depicted in FIG. 3 includes various elements that are applicable to the systems of FIG. 1 only, FIG. 2 only, or both FIGS. 1 and 2.

The controller 300 of FIG. 3 is depicted as a general purpose computer comprising a central processing unit (CPU)

320, input/output (I/O) circuitry 310, support circuitry 330 and memory 340. The memory 340 may be a solid state memory, a disk drive, an optical memory, a removable memory device or a combination of any of these memory devices. The support circuitry 330 comprises such well known support components as cache memory, power supplies, clock circuits and the like. The combination of all these components and elements forms a general purpose computer that, when executing a particular software package or routine, becomes a special purpose computer. In this case, the CPU 320 when executing a program stored in the memory 340 becomes a special purpose computer adapted to the relevant program or function.

The memory 340 is depicted as including a content supplier control model 341, a server complex control method 342, navigation functions 343, subscriber usage data 334, a server-centric data base 345 and a content-centric data base 346.

The content supplier control model 341 comprises the agreement between a service provider and various content suppliers 110 (or 210). In the case of the controller 300 of FIG. 3 being used in the system 100 of FIG. 1, the CPU 320 communicates with the content suppliers 110 and server complex 130 via, respectively, the control signals RULES and SC via the I/O circuitry 310.

The content supplier control model defines all necessary interactions between the controller 120 and the content suppliers 110. Those interactions comprise the size of the partition or partitions leased to each content supplier 110, the cost for leasing such partition or partitions, the per title fee paid by the MSO to the content supplier (and any permutations of this fee structure) and other data. The content supplier control model 341 includes the RULES coupled to the content suppliers 110 defining the form in which content is to be provided to the server complex 130, as well as the navigation and other information provided by the content supplier 110.

The server complex control method 342 defines all of the control functionality needed to manage the operation of the server complex 130.

The navigation function 343, in conjunction with the server complex control method 342, is used to provide a navigation functionality to subscribers 150 within the system 100. Additionally, the server complex control method 342 includes session management capabilities and subscriber interaction capabilities.

The subscriber usage data base 344 comprises a data base including subscriber usage data. The stored subscriber usage data is provided to the content suppliers 110, in at least an aggregate form, such that the content suppliers 110 may intelligently manage the titles made available through their respective server complex partitions 135. Thus, the subscriber usage data base provides information upon which the content suppliers 110 base provisioning decisions and other content related decisions. As previously noted, the content suppliers 110 are incentivized by the fee per title compensation structure to insure that the respective partitions include content desired by the relevant subscriber base.

The server-centric data base 345 is used to store statistical and actual data related to the operation of the server complex 130. This information includes data relating to the loading or utilization levels of the various video servers within the server complex. In this manner, the controller 120 may identify those servers that are overutilized and responsively migrate users and/or titles to relatively underutilized servers. Such load balancing within the server complex 130 and other management functions benefit from the information within the server loading data base 345.

The content-centric data base 346 is used to store statistical and actual data related to the consumption of content by the subscriber community. Specifically, the content-centric data comprises data related to subscriber interest in particular forms of content, as well as date and time correlations associated with such interest. In this manner, controller 120 may identify subscriber preferences with respect to content and content delivery.

In the embodiment of FIG. 1, the service provider pays the content providers or suppliers based upon the subscriber usage and, more particularly, the subscriber usage terms within a leased space usage agreement. Thus, the service provider receives revenue from subscribers in exchange for providing to those subscribers requested content. The service provider pays content suppliers for the requested content based upon the usage of such content by subscribers. The content suppliers lease storage space within the server complex of the service provider to store content which may be requested by subscribers. By managing the titles stored within the leased storage partitions, the content suppliers maximize the number of titles or other content requested by subscribers and, thereby, maximize the revenues responsively provided to the content suppliers from the MSO.

In this manner, the MSO is able to concentrate on managing the complexity of supplying an infrastructure, servicing and an installed and growing subscriber equipment base, and responsively providing content to subscribers in response to requests for same. The MSO effectively out sources the content or title decisions to the content suppliers, thereby reducing the risk of incorrectly determining which content is profitable. Similarly, the content suppliers 110 are able to closely manage the type of content to be supplied to subscribers by adapting the titles, video assets or other content stored in respective storage partitions according to market conditions as viewed by the content suppliers. In this manner, content suppliers leverage their expertise in determining which video assets or other content are profitable or desirable to subscribers, while MSOs leverage their expertise in fulfilling such subscriber requests for content.

Figure 4:
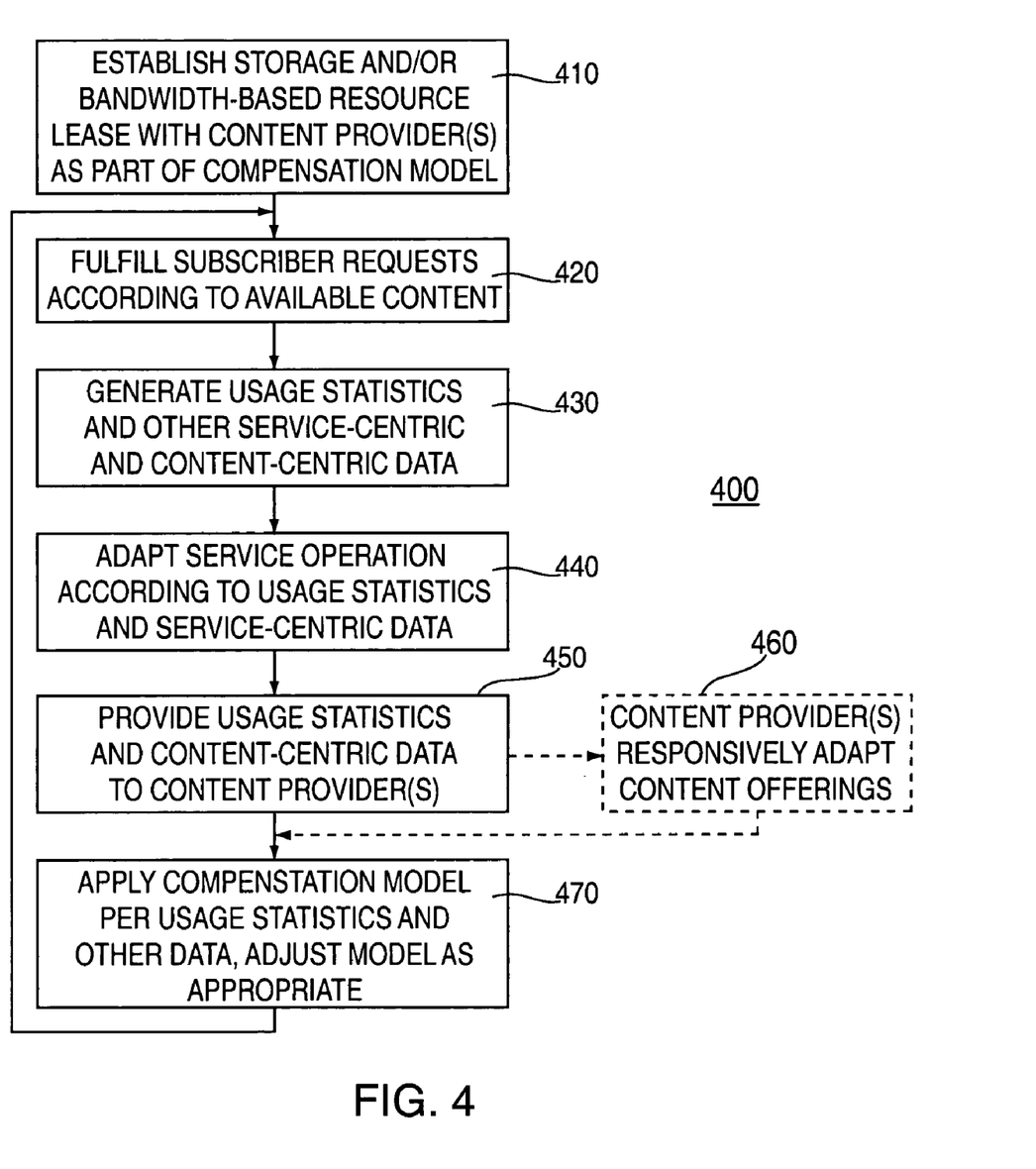
FIG. 4 depicts a flow diagram of a shared management model suitable for use in the interactive information distribution system of FIG. 1.

FIG. 4 depicts a flow diagram of a shared management model suitable for use in the interactive information distribution system of FIG. 1. Specifically, the method 400 of FIG. 4 may be used by an information distribution service provider receiving content from one or more content suppliers and providing that content to a subscriber base in a broadcast manner or in response to subscriber interactions indicative of subscriber requests for particular content.

The method 400 begins at step 410, when a storage and/or bandwidth-based resource lease agreement is established with one or more content providers as part of a compensation model. Within the context of a typical compensation model, the service provider compensates the content provider on a per title, per view or other appropriate revenue metric associated with the content that the service provider transmits to subscribers. This portion of the compensation model contemplates the lease by one or more content suppliers or respective storage resources or bandwidth resources available within, for example, the server complex 130 of the interactive information distribution systems 100 of FIG. 1.

At step 420, the service provider fulfills subscriber requests according to the available content. That is, at step 420, requests for content stored within the leased storage space of the various content suppliers are fulfilled by the service provider.

At step 430, the service provider generates usage, statistics and other service-centric and content-centric data. Usage statistics comprise, for example, the identification of titles or other assets requested by subscribers, whether the requested titles or other assets were available to the subscriber (i.e., whether a leased partition of one or more content suppliers included the title), time and date information associated with the streaming of the requested title to the subscriber and other statistical information associated with the subscriber's purchase or request for the title or other assets.

Service-centric data comprises information relating to the operation of the information distribution system and, more particularly, information relating to the efficiency of such operation. For example, the service provider ideally provides subscriber fulfillment at the lowest cost, where cost is defined in terms of bandwidth utilization, capital equipment expenditures required to maintain subscriber satisfaction levels and other similar considerations.

Content-centric data comprises data related to subscriber interest in particular forms of content, as well as date and time correlations with such interest. Content-centric ideally provides an indication to the content supplier of the time of day, day of week, time of year, and other information including demographic information associated with subscriber interest in particular forms of content. Such information is deemed useful in allowing content suppliers or providers to make rational programming decisions intended to maximize the value of the leased storage and/or bandwidth within the service provider.

At step 440, the service operation is adapted according to the usage statistics and service-centered data. That is, at step 440, usage statistics and service-centered data indicative of the content desired by the subscriber base, the use of system resources by the subscriber base, the time of such use (and other information) is used to adapt service provider operations such that system efficiency, and customer satisfaction associated with system efficiency, are enhanced. That is, latency and other factors capable of degrading the quality of the user interaction may be addressed and/or minimized. The service provider adapts the service and content offerings to ensure that user interaction is handled efficiently and that the desired content is available to the subscriber base.

At step 450, the usage statistics and content-centric data are provided to the content provider's leasing resources of the service provider. Optionally, such usage statistics and/or content-centric data may be sold, with or without subscriber-related demographic data, to third parties.

At optional step 460, the content providers responsively adapt the content offerings stored within their respective leased storage in response to the usage statistics and content-centric data. In this manner, the content providers use the usage statistics and content-centric data to make rational programming choices intended to encourage subscriber requests for their content.

At step 470, the compensation model defining the relationship between the content providers and service provider is applied per the usage statistics and other data. For example, revenue provided by content suppliers to the service provider as payments for the leased resources is offset by fees owed to the content suppliers resulting from subscriber access of the supplied content. It will be appreciated by those skilled in the art that the service provider also receives fees from the various subscribers for access to content on a pay-per-view, package subscription, broadcast access or other subscription model. Additionally, any adjustments to the compensation model may be made based upon the usage statistics and other data as deemed appropriate by the relevant parties.

After establishing the initial compensation model and lease terms with the content providers at step 410, the remaining steps 420 through 470 of the method 400, are iteretively repeated.

Figure 5:
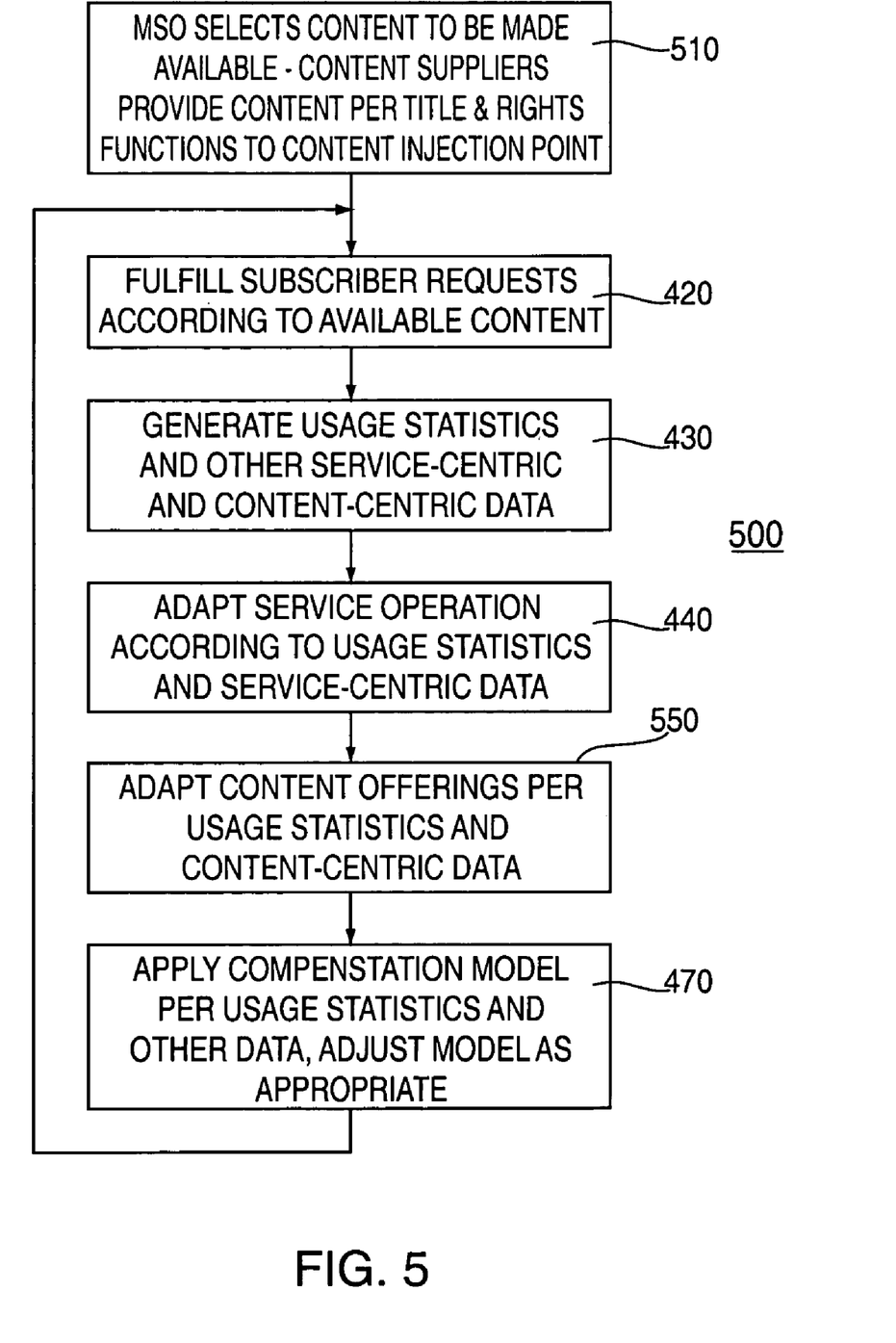
FIG. 5 depicts a flow diagram of a shared management model suitable for use in the interactive information distribution system of FIG. 2.

FIG. 5 depicts a flow diagram of a shared management model suitable for use in the interactive information distribution system of FIG. 2. Specifically, the method 500 of FIG. 5 may be used by the information distribution service provider receiving content from one or more content suppliers and providing that content to a subscriber base in a broadcast manner or in response to subscriber interactions indicative of subscriber requests for particular content.

The method 500 begins at step 510, when an MSO or other service provider selects content to be made available to the subscriber base. Content suppliers provide the selected content to a content injection point according to title and rights functions negotiated between the content supplier and service provider.

At step 420, the service provider fulfills subscriber requests according to the available content. At step 430, the service provider generates usage statistics and other service-centered and content-centered data. At step 440, the service operation is adapted according to the usage statistics and service-centered data. Steps 420, 430 and 440 are discussed in more detail above with respect to FIG. 4.

At step 550, the content offerings are adapted per the usage statistics and content-centered data. That is, the MSO or other service provider utilizes the usage statistics and content-centered data to identify the content most desired by the subscriber base and to identify the usage patterns of the system by the subscriber base. In this manner, content may be adapted to the particular taste of the subscriber base, while the resources allocated to serve the subscriber base may be adapted to the usage of the system by the subscriber base.

At step 470, the compensation model defining the relationship between the content providers and service providers is applied per the usage statistics and other data, as discussed above with respect to FIG. 4. The method 500 of FIG. 5 iteratively performs steps 420 through 470.

Although various embodiments which incorporate the teachings of the present invention have been shown and described in detail herein, those skilled in the art can readily devise many other varied embodiments that still incorporate these teachings.

What is claimed is:

1. A method, comprising the steps of:

establishing, by a cable television system operator, a resource lease with each of at least one content provider, each content provider storing at least some of a plurality of video assets within a leased memory resource at a cable television system operator location, each resource lease defining for a respective content provider a size of an assigned memory partition of a server complex;

fulfilling subscriber requests for available content stored at the cable television system operator location by providing the requested content to said subscribers using a cable television delivery system;

generating usage statistics and content-centric data, wherein said usage statistics comprise data relating to titles and availability of video assets requested by subscribers, and said content-centric data comprises data related to consumption of content including at least subscriber interest in certain content as well as date and time correlations associated with such subscriber interest;

providing said usage statistics and content-centric data to said at least one content provider;

selecting, according to said at least one content provider, which video assets are stored in said leased memory resource;
changing a size of said leased memory resource in response to said usage statistics; and
adapting, by the at least one content provider, the content in the at least one assigned memory partition based on said usage statistics and content-centric data.

2. The method of claim 1, further comprising the steps of:
generating service-centric data; and
adapting service operation according to said usage statistics and said service-centric data.

3. The method of claim 1, further comprising the step of:
remitting compensation to said at least one content provider in response to said usage statistics.

4. The method of claim 3, wherein said remitted compensation is offset by a value of said resource lease.

5. The method of claim 1, wherein said leased memory resource is adapted in response to said usage statistics.

6. The method of claim 1, comprising:
defining rules for said video assets according to said content provider, said rules comprising pricing rules for said video assets;
providing said rules from said content provider by a signal path to a controller at said cable television system operator location;
and wherein the fulfilling step comprises:
fulfilling subscriber requests for available content stored at the at least one cable television system operator location according to said rules.

7. The method of claim 1, wherein said leased memory resource comprises at least a portion of a server complex having a plurality of resource partitions, the method comprising:
migrating content assets between resource partitions according to said usage statistics.

8. A method, comprising the steps of:
assigning content management responsibilities for respective cable television system operator resources to each of a plurality of content providers according to a resource lease by a cable television system operator to each of the plurality of content providers, said cable television system operator resources comprising memory resources, wherein each resource lease defines for a respective content provider a size of an assigned memory partition of a server complex;
fulfilling subscriber requests for available content stored at a cable television system operator location by providing the requested content to said subscribers using a cable television delivery system;
generating usage statistics and content-centric data, wherein said usage statistics comprise data relating to titles and availability of video assets requested by subscribers, and said content-centric data comprises data related to consumption of content including at least subscriber interest in certain content as well as date and time correlations associated with such subscriber interest;
selecting, in response to information provided by said content providers, which video assets are stored within said respective cable television system operator memory resources; and
changing a size of said memory resource in response to said usage statistics; and
adapting, by the at least one content provider, the content in the at least one assigned memory partition based on said usage statistics and content-centric data.

9. The method of claim 8, further comprising the steps of:
generating service-centric data; and
adapting service operating according to said usage statistics and said service-centric data.

10. The method of claim 8, further comprising the step of:
remitting compensation to said at least one content provider in response to said usage statistics, wherein said remitted compensation is offset by a value of said resource lease.

11. The method of claim 10, comprising:
defining rules for said video assets according to said content provider, said rules comprising pricing rules for said video assets;
providing said rules from said content provider by a signal path to a controller at said cable television system operator location;
and wherein the fulfilling step comprises:
fulfilling subscriber requests for available content stored at the at least one cable television system operator location according to said rules.

12. Apparatus coupled to a plurality of subscribers and to content suppliers, the apparatus comprising:
a server complex, at a cable television system operator location, comprising a plurality of memory partitions, each of said memory partitions storing video assets provided by a respective content supplier, each of said memory partitions being assigned to a content supplier in accordance with a respective resource lease and having a size defined by the respective resource lease; and
a controller configured for: (i) controlling distribution of said video assets through a cable television delivery system, (ii) providing usage statistics and content-centric data to said content suppliers, wherein said usage statistics comprise data relating to titles and availability of video assets requested by subscribers, and said content-centric data comprises data related to consumption of content including at least subscriber interest in certain content as well as date and time correlations associated with such subscriber interest, (iii) selecting which of said video assets are stored in said respective memory partitions in response to said content suppliers, (iv) changing a size of said memory partition in response to said usage statistics; and (v) adapting, by at least one content supplier, the content in at least one memory partition based on said usage statistics and content-centric data.

13. The apparatus of claim 12, wherein content suppliers provision respective server complex partitions according to rules implemented by said controller.

14. The apparatus of claim 13, wherein said rules define at least one of a navigation parameter, a promotion parameter and a packaging parameter of said video assets provided by said content suppliers.

15. The apparatus of claim 12, wherein said server complex partitions are leased by said content suppliers.

16. The apparatus of claim 12, wherein said server complex partitions are auctioned to said content suppliers.

17. The apparatus of claim 12,
wherein said controller is coupled by a signal path to said content supplier, said signal path providing rules from said content supplier to said controller, said rules defined according to said content supplier and comprising pricing rules for said video assets; and
wherein said controller is capable of distribution of said video assets according to said rules.

* * * * *